(12) United States Patent
Silverman (10) Patent No.: US 10,721,914 B2
(45) Date of Patent: Jul. 28, 2020

(54) ANIMAL FOOD DISPENSING APPARATUS

(71) Applicant: Eytan Hatan, Nahariya (IL)

(72) Inventor: Josef Silverman, Kiryat Tivon (IL)

(73) Assignee: Eytan Hatan, Nahariya (IL)

( * ) Notice: Subject to any disclaimer, the term of this patent is extended or adjusted under 35 U.S.C. 154(b) by 245 days.

(21) Appl. No.: 15/568,985

(22) PCT Filed: Apr. 21, 2016

(86) PCT No.: PCT/IL2016/050429
§ 371 (c)(1),
(2) Date: Oct. 24, 2017

(87) PCT Pub. No.: WO2016/174666
PCT Pub. Date: Nov. 3, 2016

(65) Prior Publication Data
US 2018/0125031 A1    May 10, 2018

(30) Foreign Application Priority Data

Apr. 30, 2015 (IL) .......................................... 238577

(51) Int. Cl.
*A01K 5/02* (2006.01)
*A01K 7/02* (2006.01)

(52) U.S. Cl.
CPC .......... *A01K 5/0275* (2013.01); *A01K 5/0225* (2013.01); *A01K 7/02* (2013.01)

(58) Field of Classification Search
CPC .......... A01K 5/00; A01K 5/0114; A01K 5/02; A01K 5/0225; A01K 5/0233;
(Continued)

(56) References Cited

U.S. PATENT DOCUMENTS 3,088,437 A   5/1963 Williams
3,111,113 A   11/1963 Jaquith
(Continued)

FOREIGN PATENT DOCUMENTS

CN   203115251 U   8/2013
FR   2373227 A1   7/1978
(Continued)

OTHER PUBLICATIONS

International Search Report for PCT/IL2016/050429, dated Aug. 1, 2016; 3 pages.
(Continued)

*Primary Examiner* — Peter M Poon
*Assistant Examiner* — Danielle A Clerkley
(74) *Attorney, Agent, or Firm* — Roach, Brown, McCarthy & Gruber, P.C.; Kevin D. McCarthy (57) ABSTRACT

An automatic animal food dispensing apparatus comprises a stationary horizontal-axis tubular casing with aligned upper and lower apertures; a rotatable food dispenser having a tubular circumferential wall formed with a single aperture that is coaxial with the casing! a hopper from which animal food is gravitationally deliverable to the food dispenser; an inclined chute extending downwardly from the food dispenser, for receiving the food discharged from the food dispenser and for directing the discharged food to a bowl; and a force transmitting unit for rotating the food dispenser a predetermined and repeatable angular distance, such that a dose of the food is introducible from the hopper into the food dispenser when the aperture of the food dispenser is aligned with the upper aperture of the casing and the dose of food is completely dispensable via the lower casing aperture following rotation of the food dispenser by the predetermined angular distance.

13 Claims, 11 Drawing Sheets

(58) Field of Classification Search
CPC .. A01K 5/0275; A01K 5/0283; A01K 5/0291; A01K 7/00; A01K 7/02
USPC .......... 119/51.01, 51.5, 56.1, 57, 57.1–57.7, 119/57.92; 222/306, 368
See application file for complete search history.

(56) References Cited

U.S. PATENT DOCUMENTS

| | | | | |
|---|---|---|---|---|
| 3,139,860 | A | * | 7/1964 | Rutten ................. A01K 5/0258 119/57.2 |
| 3,204,833 | A | | 9/1965 | Weitzner |
| 3,437,075 | A | * | 4/1969 | Hawes, Jr. ............... A01K 7/02 119/57.2 |
| 3,659,754 | A | | 5/1972 | Barone |
| 3,894,660 | A | | 7/1975 | Snyder |
| 4,089,300 | A | * | 5/1978 | Keen .................... A01K 5/0258 119/57.4 |
| 4,491,086 | A | | 1/1985 | Croteau |
| 4,823,993 | A | * | 4/1989 | Siegel ............... B65G 53/4633 222/345 |
| 6,161,503 | A | | 12/2000 | Blas |

FOREIGN PATENT DOCUMENTS

| | | |
|---|---|---|
| GB | 1571947 A | 7/1980 |
| SE | 148871 C1 | 12/1955 |
| WO | 2006/051130 A1 | 5/2006 |

OTHER PUBLICATIONS

Written Opinion of the International Searching Authority for PCT/IL2016/050429, dated Aug. 1, 2016; 6 pages.

International Preliminary Report on Patentability for PCT/IL2016/050429, dated May 18, 2017; 16 pages.

Communication (office action) from a foreign (China) patent office in a counterpart foreign application (201600344317.1); dated Apr. 3, 2020; (6 pages).

Communication (search report) from a foreign (China) patent office in a counterpart foreign application (201600344317.1); dated Apr. 3, 2020—prepared Mar. 26, 2020; (3 pages).

\* cited by examiner

ANIMAL FOOD DISPENSING APPARATUS

FIELD OF THE INVENTION

The present invention relates to the field of dispensers. More particularly, the invention relates to an automatic animal food dispensing apparatus.

BACKGROUND OF THE INVENTION

Some automatic animal food dispensers, for feeding an animal when its owner is away, are known from the prior art.

WO 2006/051130 discloses an animal feeding trough which comprises a built-in hopper. A horizontal tube positioned beneath the discharge chute is equipped with a plunger for moving the dose of feed supplied to the tube towards the discharge end thereof. The plunger is retracted under the effect of a spring which is housed inside a chamber containing a piston. The chamber has a pressurized water inlet for moving the plunger and an outlet through which the water is conveyed towards a drinking bowl during the backward movement of the plunger. In this arrangement, however, the dry animal food becomes crushed and decreased in size due to the action of the horizontally moving plunger.

U.S. Pat. No. 6,161,503 discloses an automatic animal feeding and watering device. While a watering system is activated, the flowing water rotates an impeller, which in turn imparts the rotation to an elongated cylinder with cork style fins along its length. Food stored in a hopper is gravity fed into the areas between the fins and then rotates to the other side of the cylinder. The amount of food dispensed from the device may be adjusted by closure of apertures interfacing with the finned cylinder or by applying a brake to slow the rotation of the impeller and cylinder. The food is dispensed to the animal at the same time water is flowing into a bowl. By using a water powered impeller, however, the angular displacement of the cylinder, and therefore the dose of the food to be dispensed, cannot be accurately controlled. A further disadvantage of this device is that the rotated dry animal food tends to become crushed by contact with the walls of the apertures through which it is dispensed.

It is an object of the present invention to provide an automatic animal food dispensing apparatus that dispenses an accurate, predetermined dose of animal food.

It is an additional object of the present invention to provide an automatic animal food dispensing apparatus that prevents the dry and solid animal food from becoming crushed.

Other objects and advantages of the invention will become apparent as the description proceeds.

SUMMARY OF THE INVENTION

The present invention provides an automatic animal food dispensing apparatus, comprising a stationary horizontal-axis tubular casing formed with aligned upper and lower apertures; a rotatable food dispenser having a tubular circumferential wall that is coaxial with said casing and a single aperture formed in said circumferential wall; a hopper from which animal food is gravitationally deliverable to said food dispenser; an inclined chute extending downwardly from said food dispenser, for receiving the animal food which is discharged from said food dispenser and for directing said discharged animal food to a food bowl; and a force transmitting unit for rotating said food dispenser a predetermined and repeatable angular distance, such that a dose of the animal food is introducible from said hopper into said food dispenser when the aperture of said food dispenser is aligned with the upper aperture of said casing and said dose of animal food is completely dispensable via the lower aperture of said casing following rotation of said food dispenser by said predetermined angular distance.

In one aspect, a longitudinally extending edge bordering the aperture of the food dispenser is oblique with respect to a longitudinally extending edge of the upper aperture of the casing, thereby relieving a shear force that would normally act on a piece of the animal food that is wedged between said food dispenser edge and said edge of the casing upper aperture when the food dispenser is rotating in a direction towards said edge of the casing upper aperture, and also dislodging other pieces of the animal food from between said food dispenser edge and said edge of the casing upper aperture.

DETAILED DESCRIPTION OF PREFERRED EMBODIMENTS

The present invention is a dispensing apparatus that dispenses a predetermined dose of animal food. A hydraulic piston controllably displaced by pressurized water from a domestic water supply system serving as the sole source of motive power drives a rotatable food dispenser an accurate and predetermined angular distance to ensure that the entire dose of animal food will be dispensed.

Figures 1, 2:
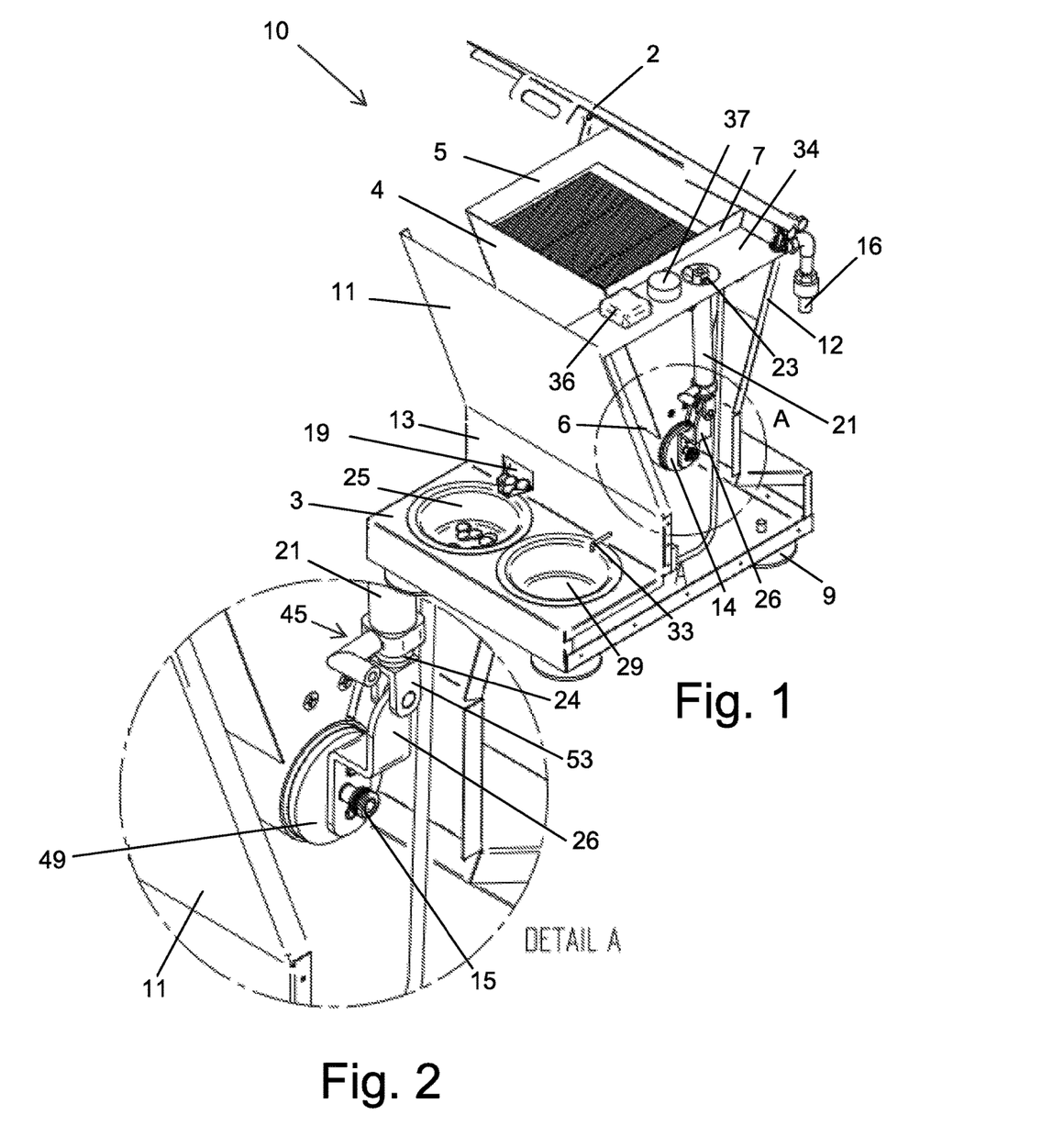
FIG. 1 is a perspective view from the side and top of animal food dispensing apparatus, according to one embodiment of the present invention, while its side walls have been removed and its upper lid is raised, showing the force transmitting unit at a starting position by which animal food is introducible into the food dispenser.
FIG. 2 is an enlargement of Detail A of FIG. 1.

FIG. 1 illustrates automatic animal food dispensing apparatus, generally indicated by numeral 10, according to one embodiment of the present invention, while its side walls have been removed and the upper lid 2 is raised.

Dispensing apparatus 10 comprises hopper 4 from which dry animal food is gravitationally delivered to the rotatable food dispenser 14. Hopper 4 has an open upper end 5 located slightly below pivotal lid 2 into which a supply of the animal food is introducible, and an open bottom end 6 significantly narrower than upper end 5 from which the animal food is discharged. The cap end 23 of cylinder 21 is rotatably mounted to an upper region of hopper side wall 7. Piston rod 24 (FIG. 10) downwardly displaceable from cylinder 21 by means of pressurized water admitted through fitting 16 is pivotally connected to bracket 26, which in turn is connected to the center of rotatable food dispenser 14.

An inclined chute 28 (FIG. 11) extends downwardly from food dispenser 14, to direct the discharged animal food to opening 19 formed in front vertical panel 13, and from opening 19 to bowl 25 positioned within lower horizontal base 3, which is separated by the underlying ground surface by a plurality of supports 9. A second bowl 29 positioned within base 3 receives water that is discharged from cylinder 21 via spout 33.

Regarding the housing of dispensing apparatus 10, oblique front wall 11, which is substantially parallel to the front wall of hopper 4, extends upwardly from front panel 13. Rear wall 12 is symmetrical with front wall 11. A strengthening beam 34 located above cylinder 21 extends between front wall 11 and rear wall 12. On top of beam 34 is positioned controller 36 and water pressure gauge 37, such as a manometer.

Figure 4:
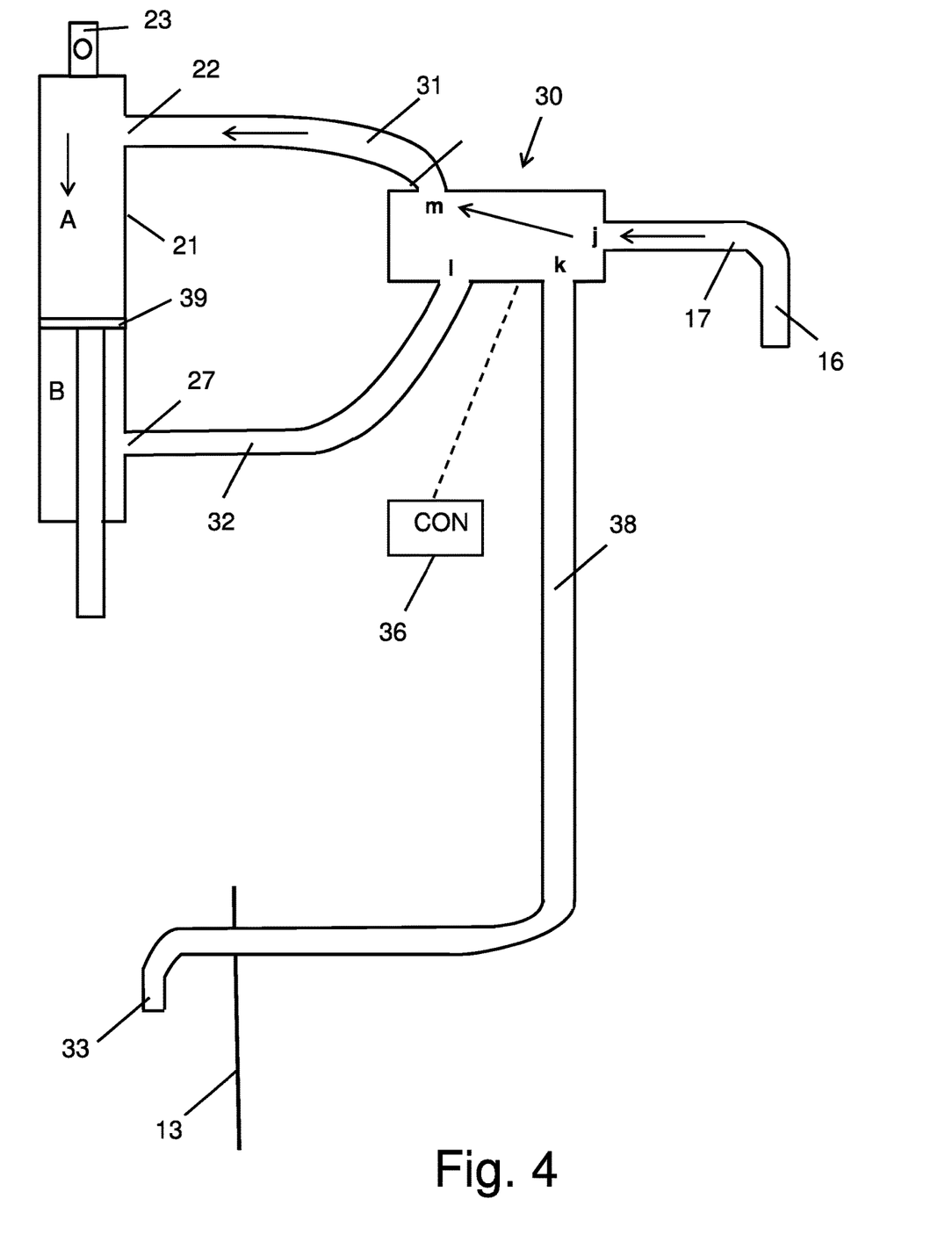
FIGS. 4-6 schematically illustrate the operation of the flow control unit in three successive cyclical stages, respectively, by which a food dispensing operation is controlled.
Figure 5:
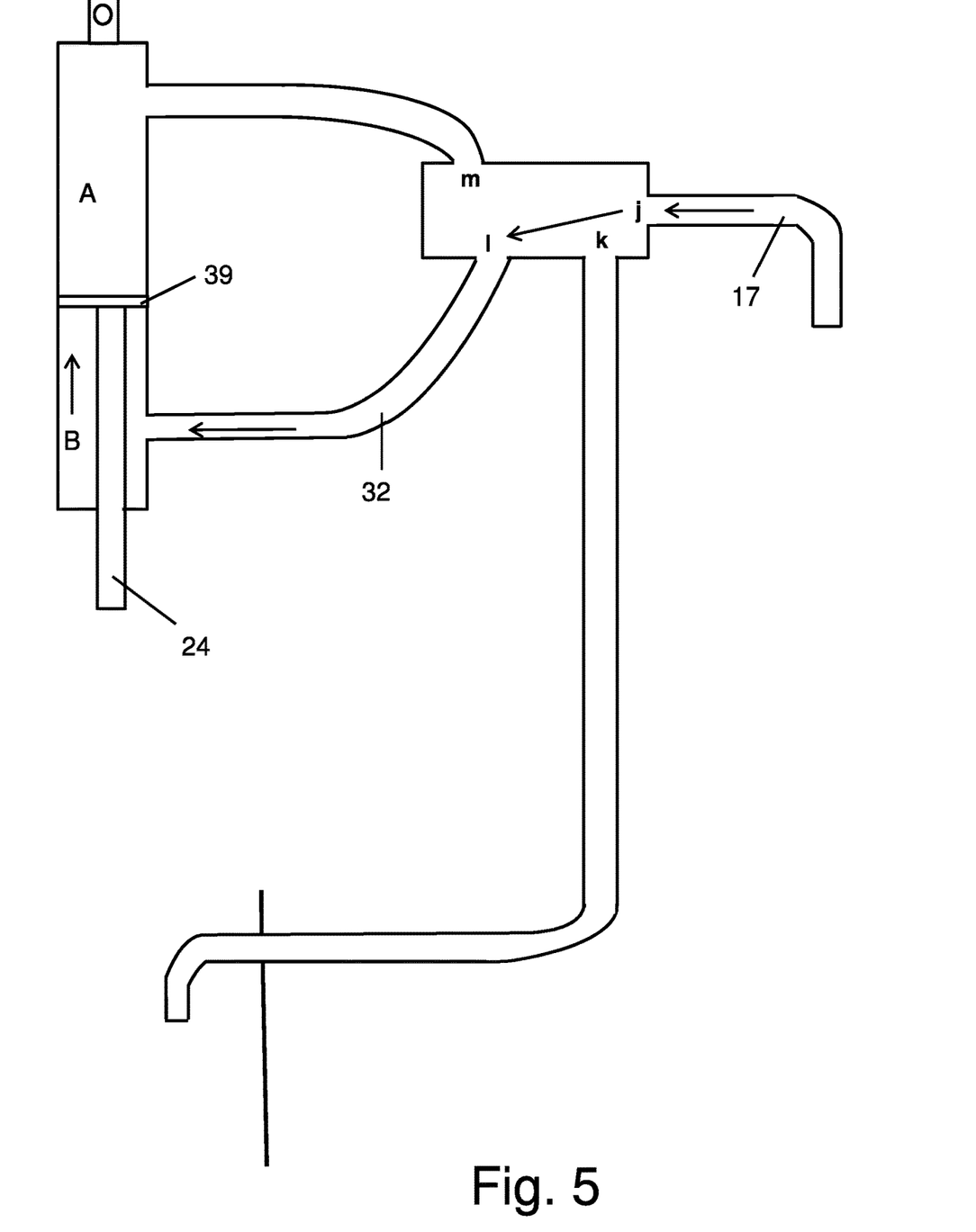
Figure 6:
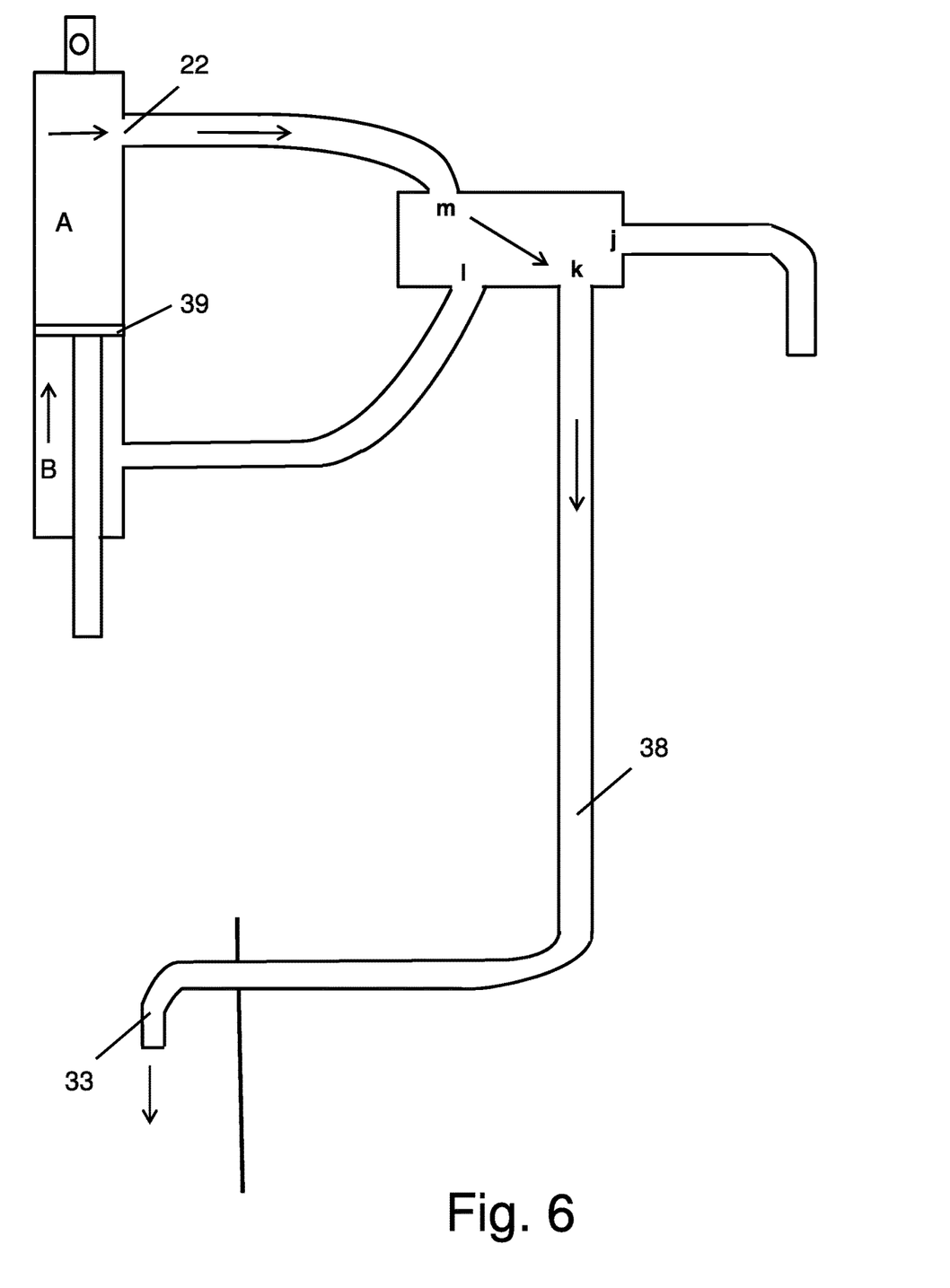

FIGS. 4-6 schematically illustrate the operation of flow control unit 30 for regulating the flow of water and therefore to controllably initiate a food dispensing operation. As shown, cylinder 21 is double acting in that hydraulic power is alternately applied to both sides of piston 39, which is displacingly fitted within the interior of cylinder 21 and divides the interior of the cylinder into two separate chambers A and B.

To provide the cyclical flow of water, cylinder 21 is provided with two ports 22 and 27, port 22 located above the uppermost position of piston 39 near cylinder cap end 23 and port 27 located below the lowermost position of piston 39. Connected to ports 22 and 27 are flexible hoses 31 and 32, which are sufficiently flexible to take into account the angular displacement of cylinder 21. A four-way, four-port directional control valve 45 is operatively connected to the other end of hoses 31 and 32, and also to water discharge conduit 38 that extends downwardly and then laterally through front panel 13 to spout 33. Control valve 45 is also operatively connected to conduit 17, which extends from fitting 16. The cyclical operation of control valve 45 is synchronized by controller 36 at selected times through a wired or wireless communication link.

In a first stage, as shown in FIG. 4, inlet port j of control valve 45 in fluid communication with conduit 17 is opened while outlet port k in fluid communication with discharge conduit 38 remains closed. Utilizing control valve 45 having two transfer ports m and l that alternate between being pressurized and exhausted, this first cycle takes place while port m is open and port l is closed. Thus water admitted through fitting 16 is therefore caused to flow through conduits 17 and 31 to chamber A, causing piston 39 and piston rod 24 connected thereto to be displaced downwardly.

In a second stage shown in FIG. 5, water admitted through fitting 16 is caused to flow through conduits 17 and 31 to chamber B after transfer port i has been opened and transfer port m has been closed. Piston 39 and piston rod 24 connected thereto are therefore caused to be displaced upwardly.

Simultaneously to the second stage is a third stage shown in FIG. 6 whereby the water previously admitted to chamber A is exhausted through ports 22 and m, in response to the upward displacement of piston 39. Outlet port k is opened, to allow the exhausted water to be discharged through conduit 38 and spout 33 to the water bowl.

The first stage may be repeated, followed by a fourth stage whereby the water previously admitted to chamber B is exhausted through ports 27 and l, in response to the downward displacement of piston 39. Outlet port k is opened, to allow the exhausted water to be discharged through conduit 38 and spout 33 to the water bowl.

The water bowl may be equipped with a float valve or with a limit switch to sense the water level within the bowl. Whenever the water level is above a predetermined high level, inlet port j is caused to be closed, such as by interaction with the controller, to prevent additional water influx until the water level within the bowl is reduced.

Figure 7:
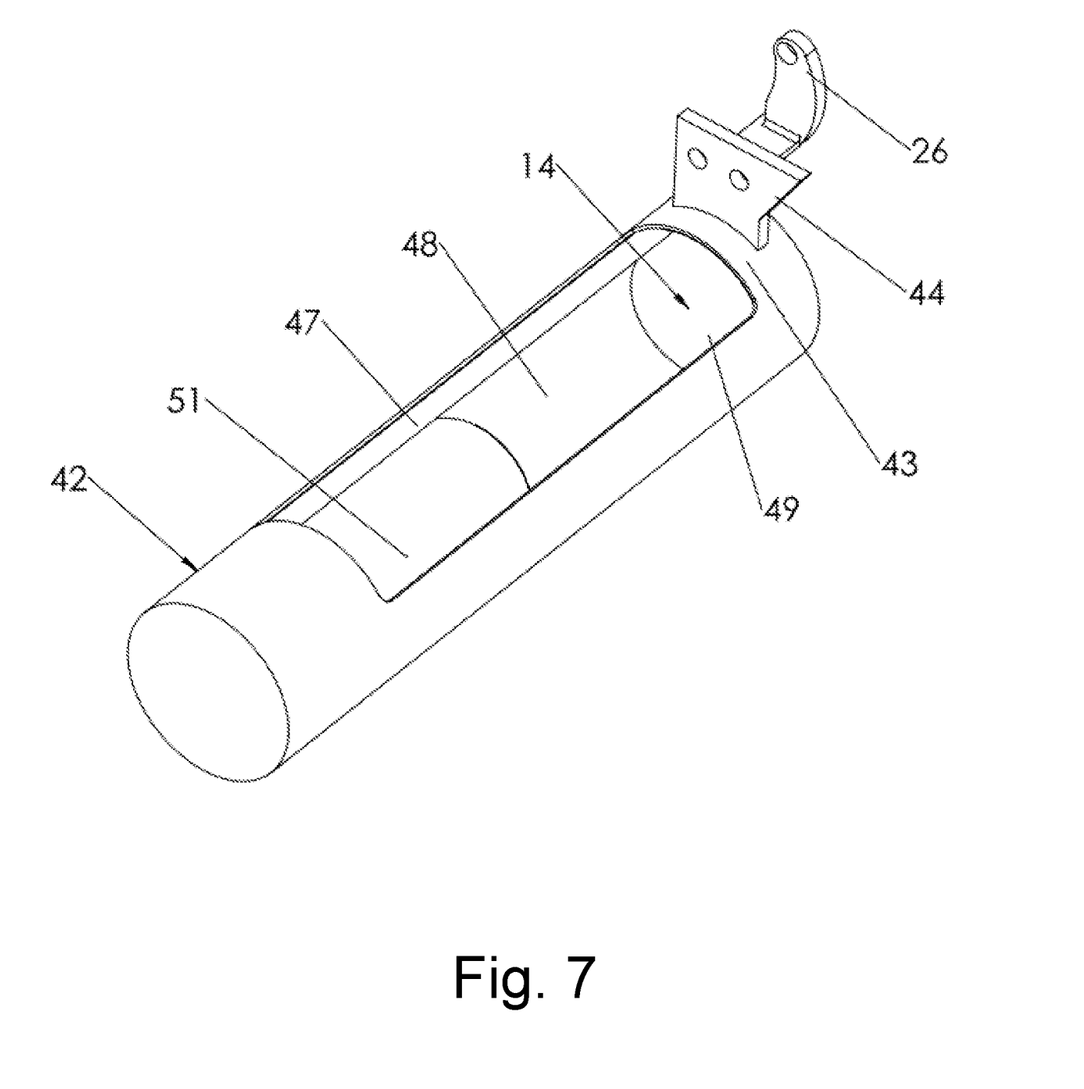
FIG. 7 is a perspective view from the top of the food dispenser as it is positioned within the surrounding casing, shown when detached from the side walls of the hopper.

Reference is now made to FIG. 7, which illustrates tubular food dispenser 14 as it is positioned within surrounding tubular casing 42, shown when detached from the side walls of the hopper to which it is normally attached. A substantially vertically oriented mounting plate 44 is attached such as by welding to the upper face 43 of casing 42 at a first longitudinal end thereof. Although only one mounting plate 44 is shown, it will be appreciated that a second mounting plate is also attached to upper face 43 at the second longitudinal end of casing 42.

Rotatable food dispenser 14 comprises a tubular circumferential wall 47 formed with a longitudinally extending aperture 48, and a circular wall 49 at the first longitudinal end thereof. Bracket 26 is fixedly connected to circular wall 49 in such a way to avoid interference with mounting plate 44.

The second longitudinal end of food dispenser 14 is unobstructed, to permit selective longitudinal displacement of a cylindrical volume reducer 51 within the interior of food dispenser 14, whether hydraulically, electrically or manually, as well known to those skilled in the art.

For example as shown in FIG. 2, a socket head screw 15 passing through the center of circular wall 49 is threadedly engaged with a linear actuator formed in the inner surface of circumferential wall 47 of food dispenser 14, for converting rotational motion to linear motion, or with an interface element engaged with the linear actuator. One longitudinal end of volume reducer 51 is threadedly engaged with the linear actuator. Exemplary linear actuators include a ball screw and a roller screw. Upon rotating the socket head screw 15 with a hex key, volume reducer 51 is longitudinally displaced within the interior of food dispenser 14 to define the volume of the food dispenser interior and consequently the dose of animal food to be dispensed.

Figure 8:
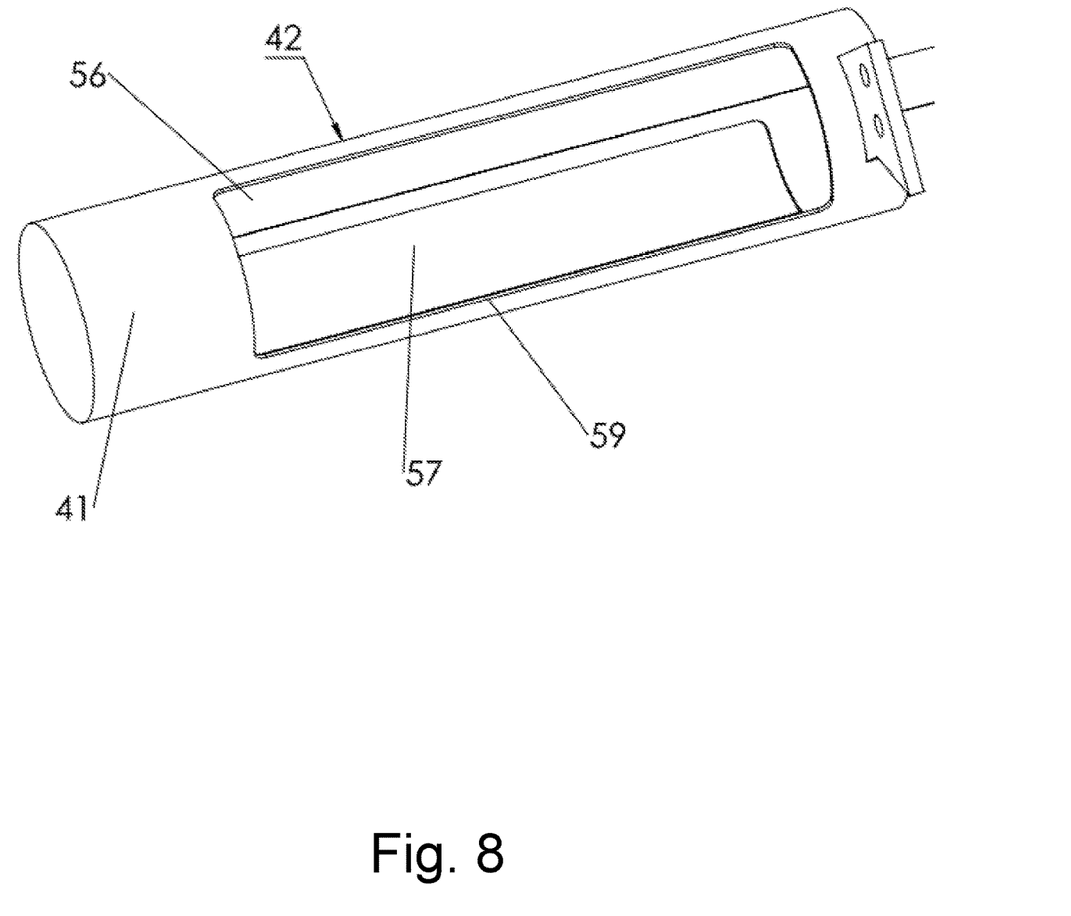
FIG. 8 is a perspective view from the top of the casing of FIG. 7, shown after the food dispenser has been removed therefrom.

The tubular wall 41 of casing 42 is shown in FIG. 8 to be formed with an upper longitudinally extending aperture 56 that is diametrically opposed to, and aligned with, a lower longitudinally extending aperture 57. Thus when the aperture 48 of the inner food dispenser 14 is aligned with the upper aperture 56 of the outer casing, as shown in FIG. 7, animal food is able to be introduced into the interior of the food dispenser. Animal food ceases to be introduced when circumferential wall 47 of food dispenser 14 approaches longitudinally extending edge 59 of aperture 57, causing aperture 57 to be occluded.

Figure 3:
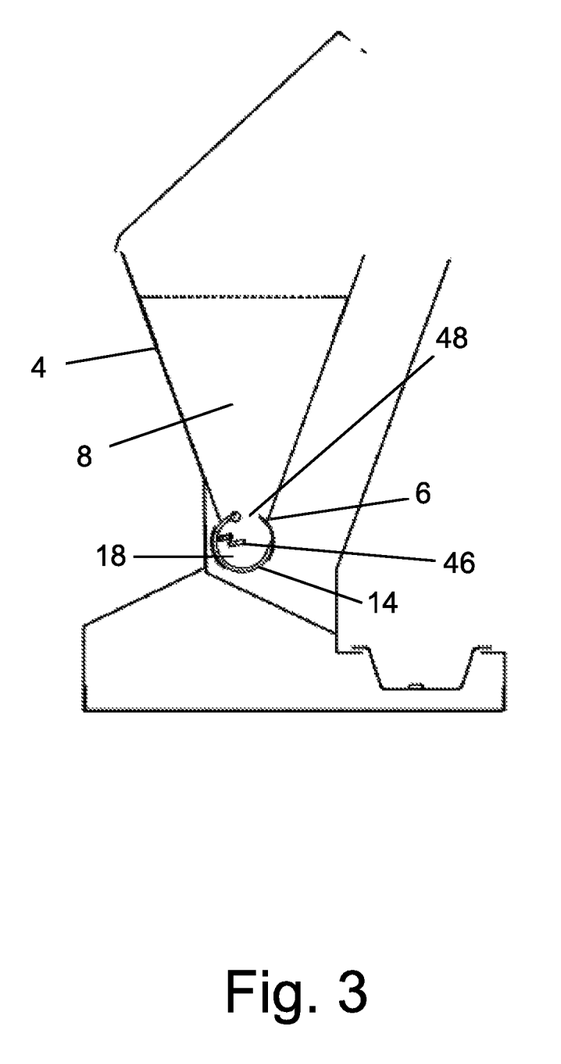
FIG. 3 is a vertical cross sectional view of the apparatus of FIG. 1, cut along a plane perpendicular to the axis of the food dispenser.

FIGS. 1-3 illustrate the force transmitting unit at a starting position by which animal food is introducible into the food dispenser. Force transmitting unit 45 comprises piston rod 24 retractable with, and extendible from, cylinder 21, coupler 53 connected to the end of piston rod 24, angled bracket 26 pivotally connected to coupler 53 to provide a mechanical advantage, and the circular end wall 49 of the food dispenser to the center of which bracket 26 is connected.

At the starting position, cylinder 21 and bracket 26 are disposed at a close to vertical orientation such that the axis of cylinder 21 is directed to a certain extent towards oblique front wall 11, e.g. up to 10 degrees from the vertical orientation, and piston rod 24 is completely retracted. The single aperture 48 of food dispenser 14 is consequently upwardly oriented while being located within the open bottom end 6 of hopper 4, such that the interior 8 of hopper 4 is in communication with the interior 18 of food dispenser 14. Animal food 46 is therefore gravity fed from the hopper interior 8 into food dispenser 14.

Figures 9, 10:
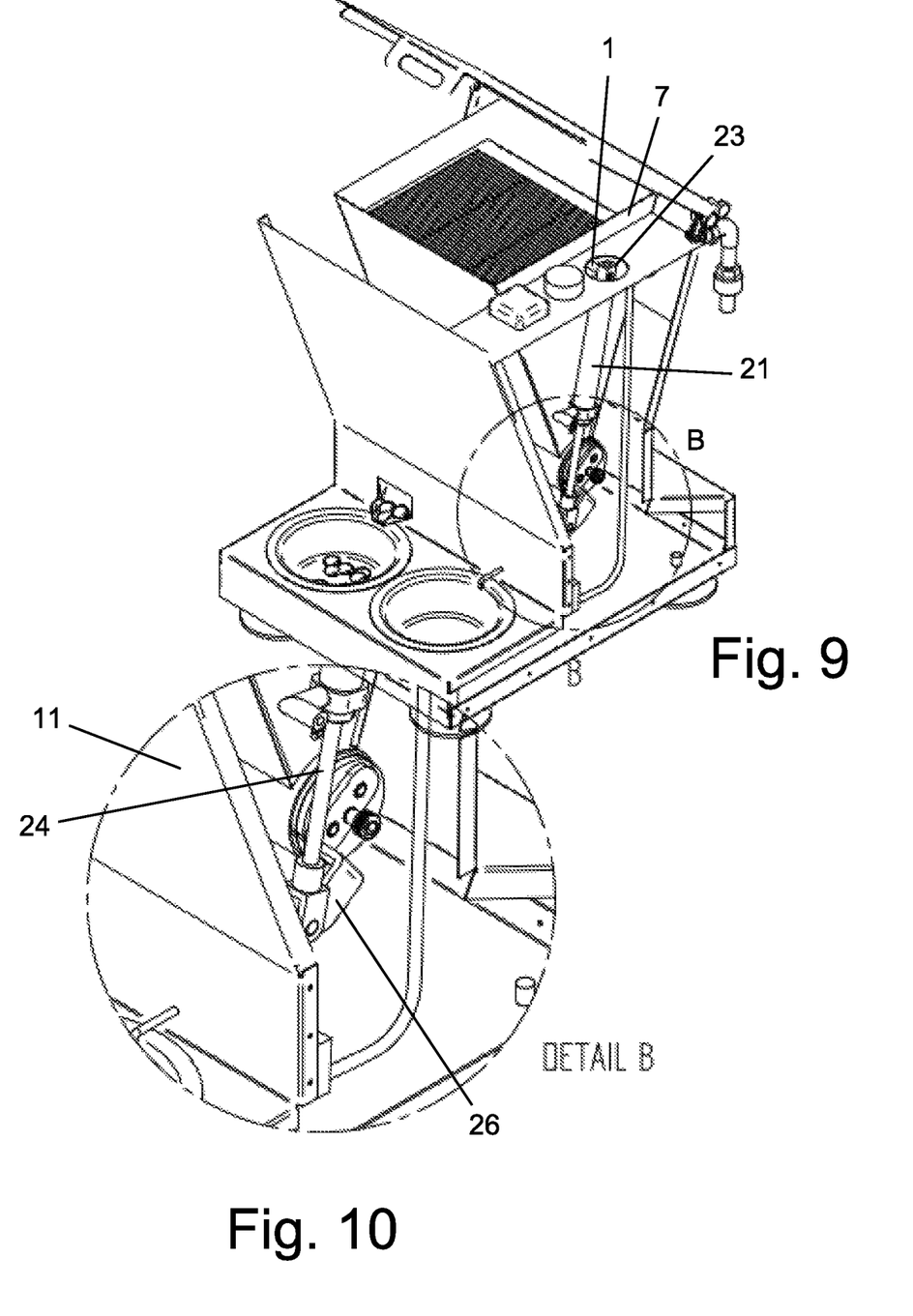
FIG. 9 is a perspective view from the side and top of animal food dispensing apparatus, according to one embodiment of the present invention, while its side walls have been removed and its upper lid is raised, showing the force transmitting unit at an ending position by which animal food is dischargeable from the food dispenser onto the chute.
FIG. 10 is an enlargement of Detail B of FIG. 9.
Figures 11, 14:
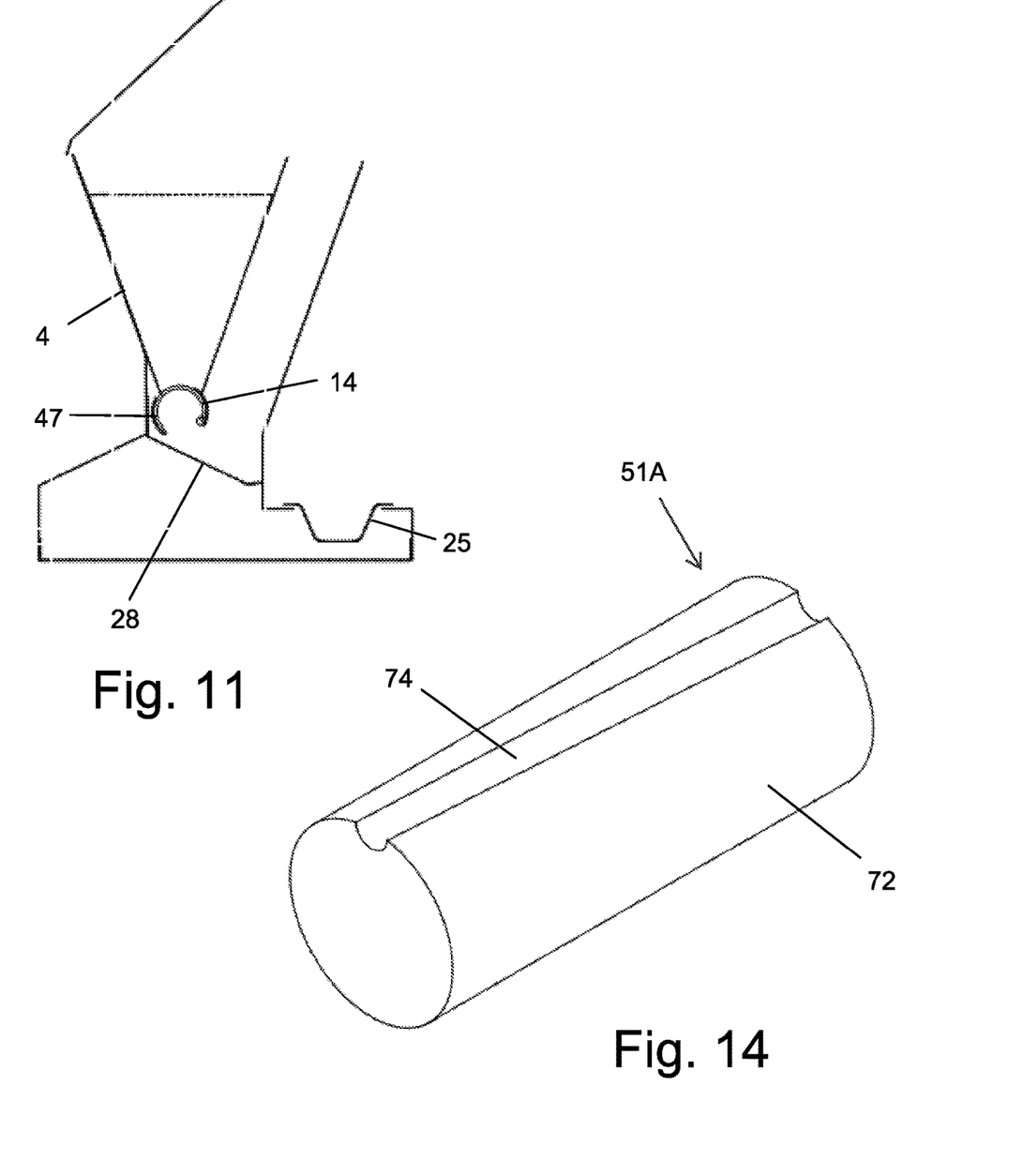
FIG. 11 is a vertical cross sectional view of the apparatus of FIG. 9, cut along a plane perpendicular to the axis of the food dispenser.
FIG. 14 is a perspective view from the top of a volume reducer which is introducible into the food dispenser of FIG. 13 and engageable with the oblique lip.

FIGS. 9-11 illustrate the force transmitting unit at an ending position, following operation of the flow control unit. As a result of the linear extension of piston rod 24, a moment is developed which causes bracket 26 to rotate in a counterclockwise direction according the illustrated orientation towards front wall 11 until coupler 53 becomes positioned close to front wall 11 and cylinder 21 to pivot in a clockwise direction about pin 1 connecting cylinder cap end 23 to hopper side wall 7. Due to this motion, food dispenser 14 rotates together with bracket 26 a predetermined and repeatable angular distance such that aperture 48 of food dispenser 14 is downwardly oriented and the animal food is able to be completely discharged from food dispenser 14 onto chute 28, along which the animal food is gravitationally delivered to bowl 25. Also, the circumferential wall 47 of food dispenser 14 is caused to occlude the open bottom end of hopper 4, to prevent additional animal food from being discharged while ensuring that a single dose corresponding to a predetermined volume of animal food will be discharged to bowl 25.

The angular distance along which food dispenser 14 rotates is greater than 100 degrees, and preferably ranges from 110-140 degrees. Chute 28 is inclined at least 45 degrees with respect to the horizontal plane, but preferably less than 60 degrees to minimize occupation of space within the dispensing apparatus.

Upon conclusion of this food dispensing operation, the flow control unit is additionally operated to cause retraction of the piston rod and rotation of the food dispenser to the starting position, to carry out another food dispensing operation upon demand.

Figure 12:
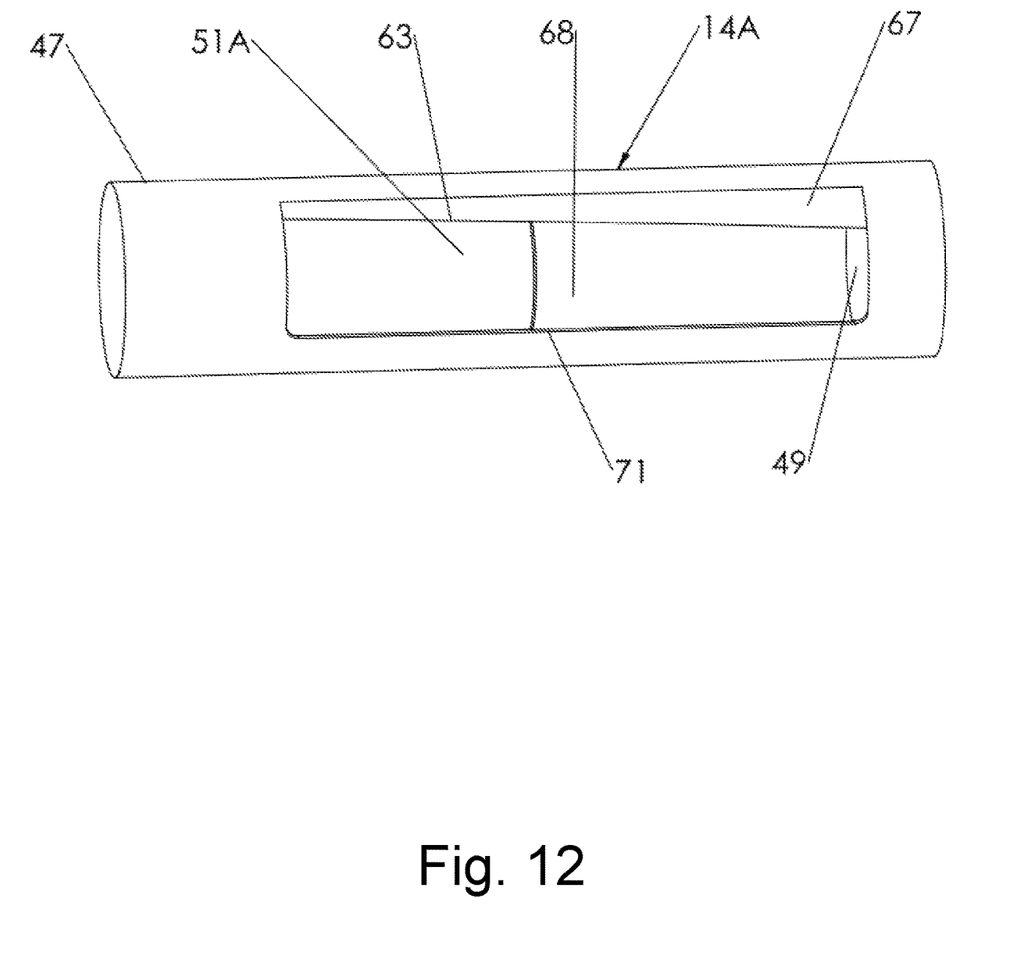
FIG. 12 is a perspective view from the top of a food dispenser according to another embodiment of the invention, when detached from the side walls of the hopper.
Figure 13:
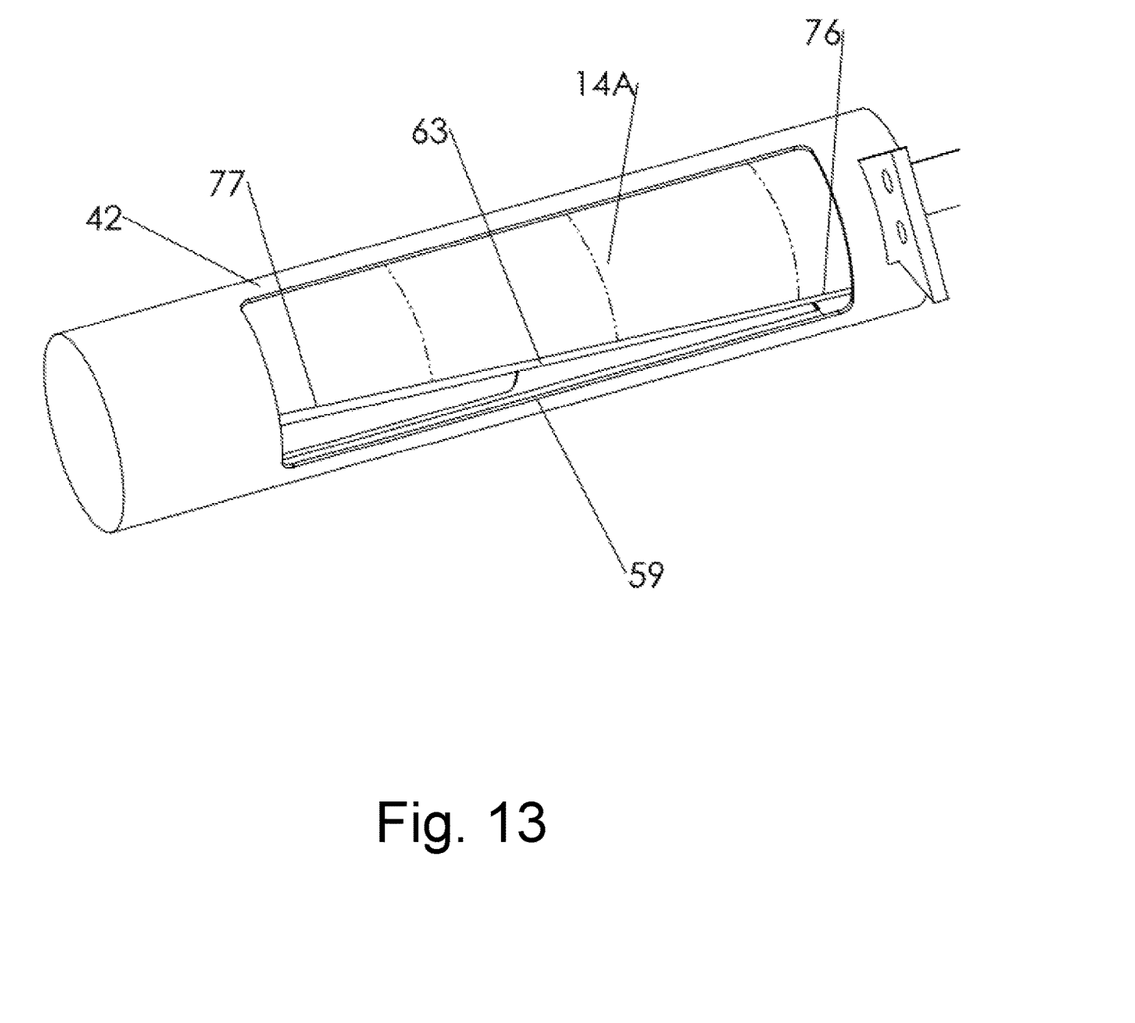
FIG. 13 is a perspective view from the top of the food dispenser of FIG. 12 as it is positioned within the surrounding detached casing, showing an oblique lip of the food dispenser approaching an adjacent edge of the casing.

FIGS. 12 and 13 illustrate food dispenser 14A according to an embodiment of the invention. In order to avoid pieces of animal food from being wedged between the food dispenser and edge 59 of casing 42 slightly before the conclusion of the food dispensing operation, requiring an increased moment to be generated by the force transmitting unit to overcome the obstruction caused by the wedged animal food and causing the wedged animal food to become crushed, and possibly leading to malfunction of the flow control unit and particularly of the piston when an excessive amount of water is admitted to generate the increased moment, food dispenser 14A is configured with an oblique lip 63.

After the metallic food dispenser 14A is machined to assume a tubular configuration with an outer circumferential wall 47, an inner cavity delimited at one longitudinal end thereof by circular wall 49 being substantially perpendicular to the axis of circumferential wall 47 and by an opening at a second longitudinal end thereof, and an aperture defined by a void area in circumferential wall 47, a circumferential appendage 67 is welded to circumferential wall 47.

Appendage 67, after being attached to circumferential wall 47, has the same curvature as the latter such that such that the composite outer wall has a smooth and continuous surface, to prevent animal food from accumulating in discontinuities. The aperture 68 defined between lip 63 and opposing straight edge 71 is sized to receive therethrough a predetermined dose of animal food discharged from hopper 4 (FIG. 1). Volume reducer 51A fitted within the opening at the second longitudinal end of food dispenser 14A is engaged with the inner surface of its composite outer wall, and serves to define the length of aperture 68.

Of course, one or both of the food dispenser and casing may be made of molded plastic, or of any other rigid material.

Slightly before the conclusion of the food dispensing operation as shown in FIG. 13, lip 63 of food dispenser 14A approaches edge 59 of casing 42. The oblique configuration of lip 63 with respect to edge 59 of casing 42 is clearly seen, such that the gap therebetween at end 76 is much smaller than the gap between lip 63 and edge 59 at the second end 77 of lip 63. This varied gap provided by oblique lip 63 serves to relieve the shear force that would normally act on a piece of animal food that is wedged between the food dispenser lip and the adjacent casing edge when the food dispenser is rotating in a direction towards edge 59, and also permits most pieces of animal food to be dislodged from the two adjacent edges.

Lip 63 protrudes inwardly from the outer wall of appendage 67, at the circumferential end thereof which borders aperture 68, to retain the animal food within the food dispenser at this stage of the food dispensing operation and to ensure that the entire dose of animal food will be discharged to chute 28 (FIG. 11). The cross section of lip 63 may be circular, or may be configured in any other desired fashion.

FIG. 14 illustrates a perspective view of volume reducer 51A. A longitudinally extending cavity 74 which is complementary to the lip of the food dispenser is formed within the tubular body 72 of volume reducer 51A and is recessed from its outer surface. The lip is engageably received in cavity 74, allowing volume reducer 51A to rotate together with the food dispenser during the course of a food dispensing operation.

As can be appreciated from the foregoing description, the apparatus of the present invention is able to automatically dispense both animal food and water at predetermined times. The quantity and type of animal food that are dispensed are suitable for the needs of the animal, primarily domesticated animals such as dogs, cats and horses, but also for semi-domesticated animals such as deer and elephants. Of course, the size and configuration of the apparatus will be customized for the type of animal to be fed.

While some embodiments of the invention have been described by way of illustration, it will be apparent that the invention can be carried out with many modifications, variations and adaptations, and with the use of numerous equivalents or alternative solutions that are within the scope of persons skilled in the art, without exceeding the scope of the claims.

The invention claimed is:

1. An automatic dispensing apparatus for dispensing a predetermined dose of animal food and configured to prevent a decrease in size of the animal food, comprising:
   a) a stationary horizontal-axis casing formed with aligned and diametrically opposite upper and lower apertures and with a tubular wall that circumferentially extends between said upper and lower apertures;
   b) a rotatable food dispenser having a tubular circumferential wall that is coaxial with, and positioned within, said casing and a single aperture formed in said circumferential wall of said food dispenser;
   c) a hopper positioned above said casing, from which animal food is gravitationally deliverable to said food dispenser;
   d) an inclined chute extending downwardly from said food dispenser, for receiving the animal food which is discharged from said food dispenser and for directing said discharged animal food to a food bowl; and
   e) a force transmitting unit for rotating said food dispenser a predetermined and repeatable angular distance, such that a dose of the animal food is introducible from said hopper into said food dispenser when the aperture of said food dispenser is aligned with the upper aperture of said casing and said dose of animal food is completely dispensable via the lower aperture of said casing following rotation of said food dispenser by said predetermined angular distance,
   wherein a longitudinally extending edge bordering the aperture of the food dispenser is oblique with respect to a longitudinally extending edge of the upper aperture of the casing,
   wherein a lip inwardly extends from the circumferential wall of the food dispenser at said oblique edge, said lip configured to retain the animal food within the rotating food dispenser,
   wherein a varied gap is defined between said food dispenser oblique edge and said edge of the casing upper aperture, said gap being sufficiently wider at a first longitudinal end of said lip than at a second longitudinal end of said lip to relieve a shear force that would normally act on a piece of the animal food that is wedged between said food dispenser oblique edge and said edge of the casing upper aperture when the food dispenser is rotating in a direction towards said edge of the casing upper aperture, to dislodge pieces of the animal food from between said food dispenser oblique edge and said edge of the casing upper aperture, and to thereby ensure that said dose of animal food will be completely discharged to the chute and to the food bowl.

2. The animal food dispensing apparatus according to claim 1, wherein the force transmitting unit is powered by a flow control unit.

3. The animal food dispensing apparatus according to claim 2, wherein the flow control unit is fed by pressurized water from a domestic water supply system, and the water discharged from the flow control unit is delivered to a water bowl.

4. The animal food dispensing apparatus according to claim 3, wherein the force transmitting unit comprises a cylinder which is rotatably mounted to a side wall of the hopper, a piston which is displaceable within said cylinder, an extendible and retractable piston rod connected to said piston, a coupler connected to an end of said piston rod, and an angled bracket pivotally connected to said coupler, said bracket also being connected to a circular end wall of the food dispenser.

5. The animal food dispensing apparatus according to claim 4, wherein the cylinder is double acting such that hydraulic power is alternately appliable to both sides of the piston.

6. The animal food dispensing apparatus according to claim 5, wherein the flow control unit comprises a control valve for controlling the flow of water and a controller for synchronizing a cyclical operation of said control valve at selected times.

7. The animal food dispensing apparatus according to claim 1, wherein a longitudinally displaceable volume reducer is receivable within the interior of the food dispenser to define a desired dose of the animal food.

8. The animal food dispensing apparatus according to claim 7, wherein the volume reducer has a tubular body which is formed with a longitudinally extending cavity that is complementary to the lip of the food dispenser, the lip being engageably receivable in said cavity to facilitate rotation of the volume reducer together with the food dispenser during a food dispensing operation.

9. The animal food dispensing apparatus according to claim 1, wherein the angular distance along which the food dispenser rotates is greater than 100 degrees.

10. The animal food dispensing apparatus according to claim 9, wherein the angular distance along which the food dispenser rotates ranges from 110 to 140 degrees.

11. The animal food dispensing apparatus according to claim 1, wherein the lip is configured with a circular cross section.

12. The animal food dispensing apparatus according to claim 1, wherein the chute has a uniform inclination with respect to the horizontal plane between two opposed housing panels of the apparatus which are outwardly spaced from the hopper.

13. The animal food dispensing apparatus according to claim 12, wherein the inclination of the chute with respect to the horizontal plane is at least 45 degrees.

* * * * *